United States Patent [19]

Rippel et al.

[11] 4,353,969

[45] Oct. 12, 1982

[54] QUASI-BIPOLAR BATTERY CONSTRUCTION AND METHOD OF FABRICATING

[75] Inventors: Wally E. Rippel, Altadena; Dean B. Edwards, Monrovia, both of Calif.

[73] Assignee: California Institute of Technology, Pasadena, Calif.

[21] Appl. No.: 195,513

[22] Filed: Oct. 9, 1980

Related U.S. Application Data

[63] Continuation-in-part of Ser. No. 79,476, Sep. 27, 1979, Pat. No. 4,275,130.

[51] Int. Cl.³ .............................................. H01M 6/48
[52] U.S. Cl. ................................... 429/144; 429/154; 429/210; 429/225; 429/234
[58] Field of Search ............... 429/136, 144, 139, 210, 429/225, 234, 235, 154, 160

[56] References Cited

U.S. PATENT DOCUMENTS

| | | | |
|---|---|---|---|
| 2,851,509 | 9/1958 | Di Pasquale et al. | 429/136 X |
| 3,141,795 | 7/1964 | Eisler | 429/210 X |
| 3,899,351 | 8/1975 | Maurer et al. | 204/2.1 X |
| 4,029,855 | 6/1977 | Dougherty et al. | 429/136 X |

*Primary Examiner*—Anthony Skapars
*Attorney, Agent, or Firm*—Marvin E. Jacobs

[57] ABSTRACT

A lightweight, battery construction for lead acid batteries in which biplates are formed from a continuous strip of thermoplastic material, one face of the strip being provided with a plurality of electrically isolated lead strip arrays, each having a transverse axis about which the strip is folded or pleated to provide pleated biplate walls. The pleated continuous strip is sealed along edge longitudinal portions to provide chambers for receiving a plurality of non-conductive thermoplastic separator-plates and to contain electrolyte liquid. Separator-plates support resilient yieldable porous glass mats and scrim fabric in which active material is carried. The assembly of pleated biplates and separator-plates is maintained in pressure relation by exterior resilient means. A method of making such a continuous pleated biplate construction and of assembling one or more battery modules which may be connected in series or in parallel. A biplate construction having continuously wound lead stripes attached to a substrate.

22 Claims, 20 Drawing Figures

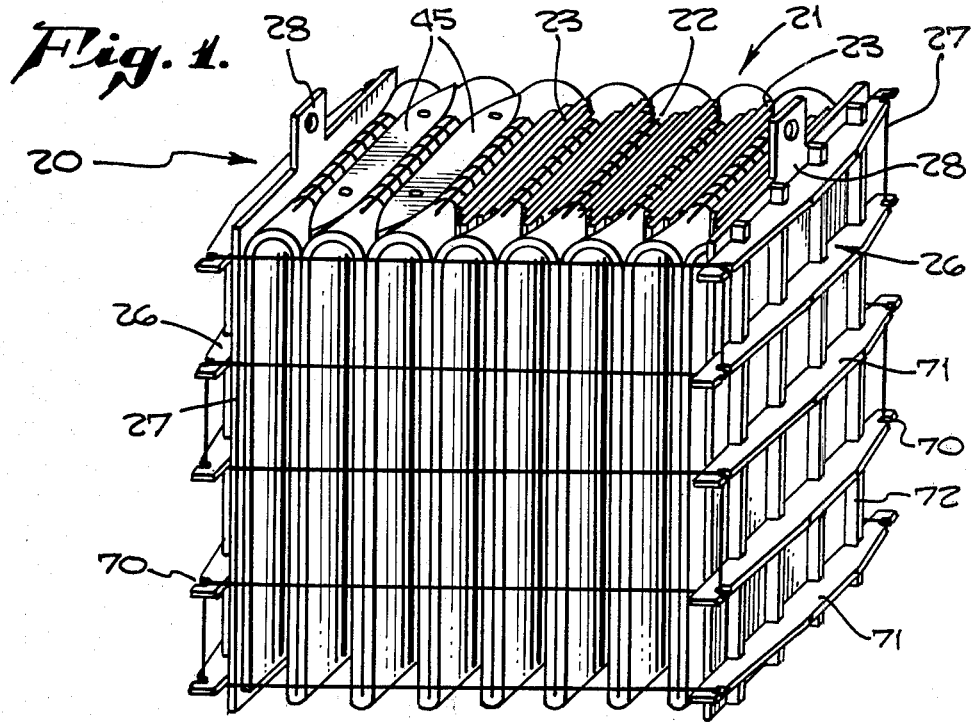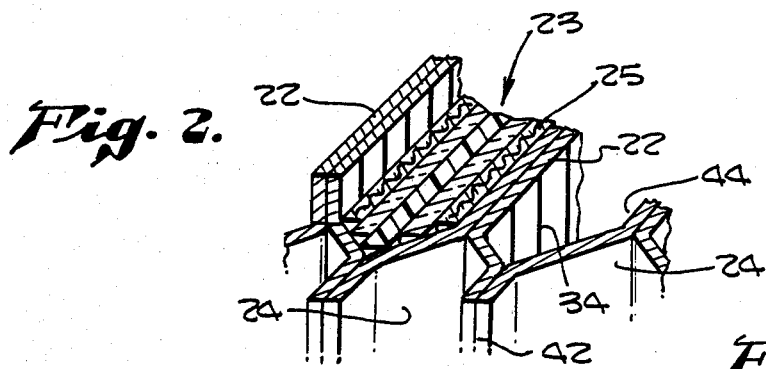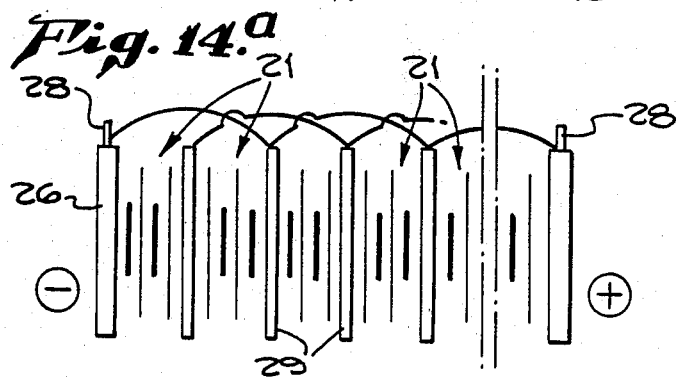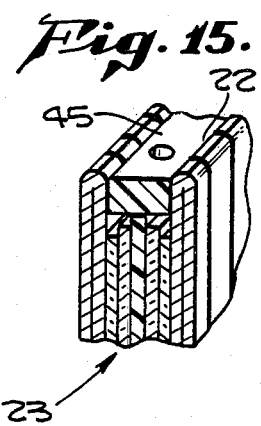

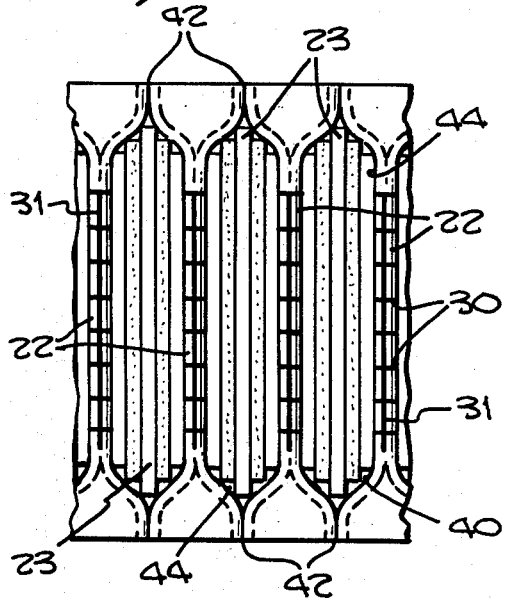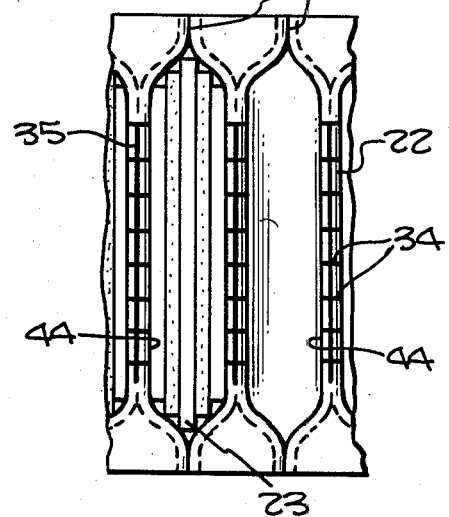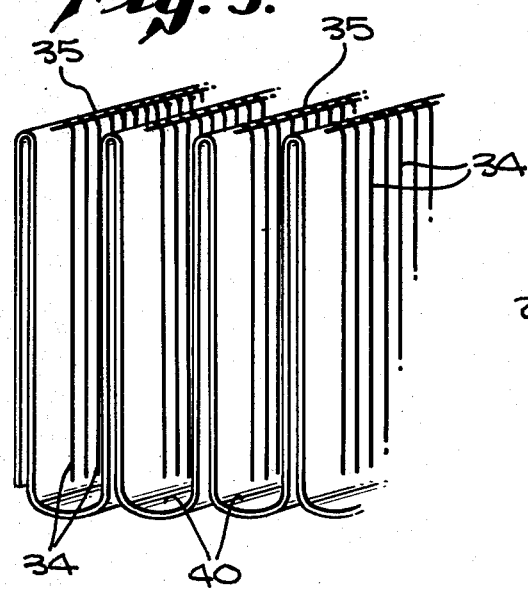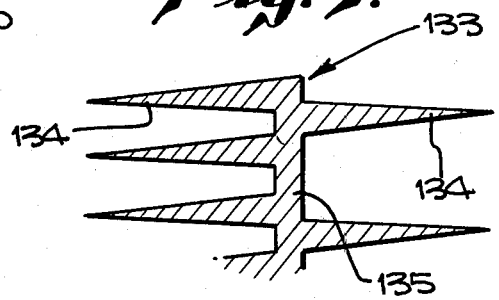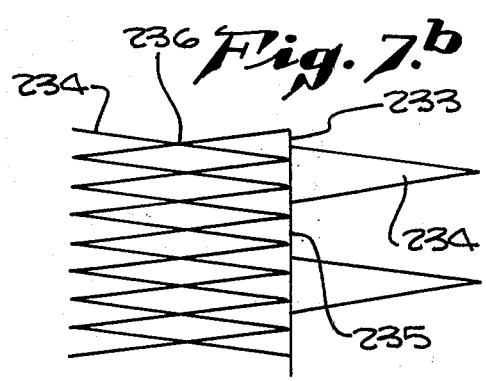

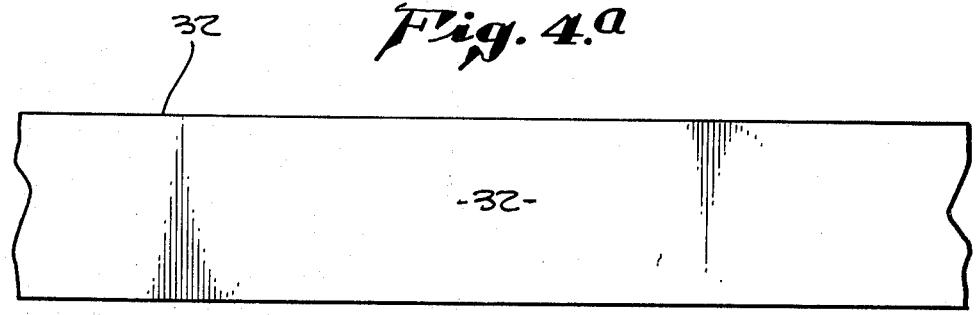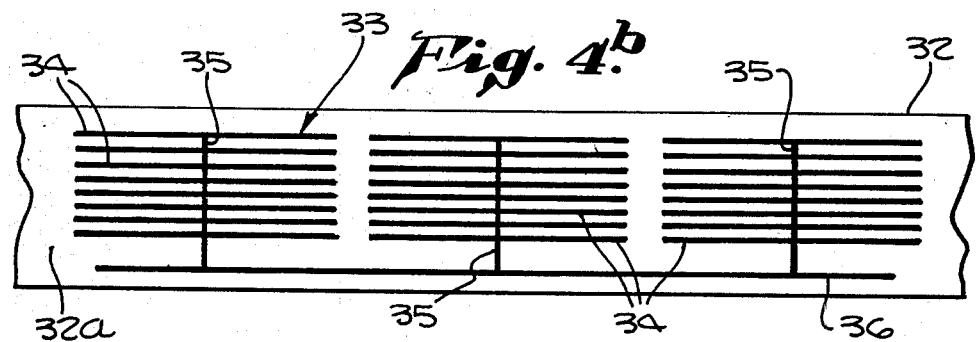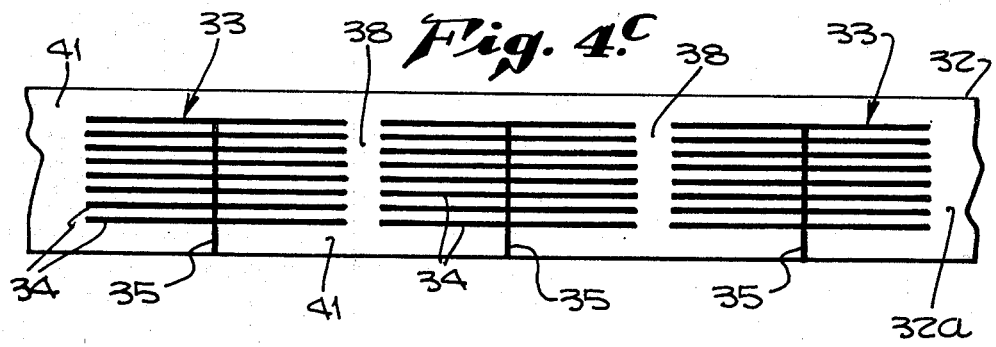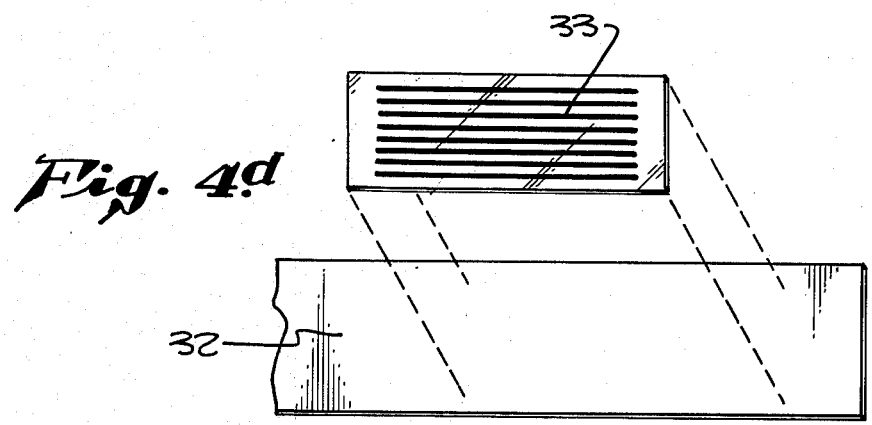

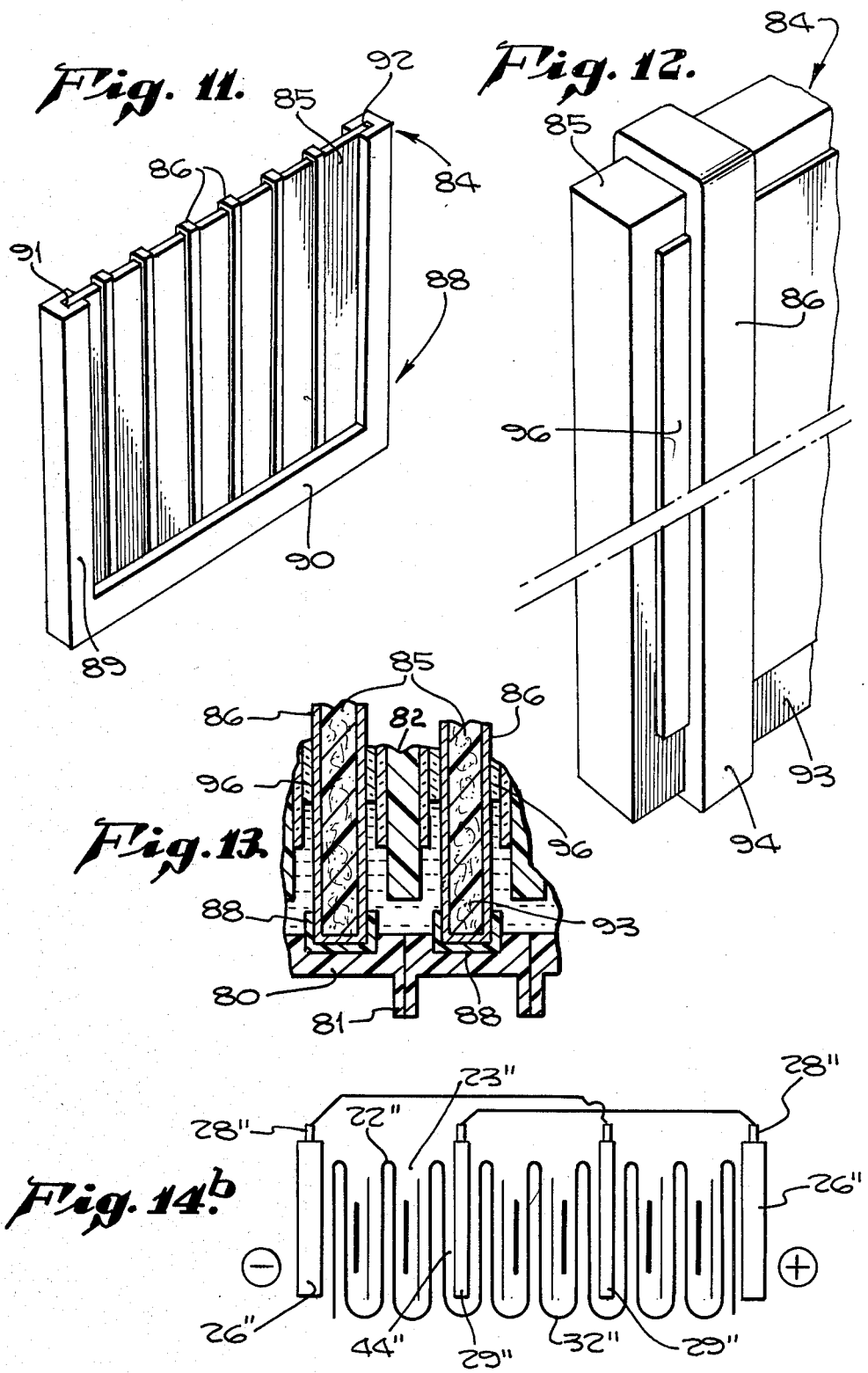

QUASI-BIPOLAR BATTERY CONSTRUCTION AND METHOD OF FABRICATING

ORIGIN OF THE INVENTION

The invention described herein was made in the performance of work under a NASA contract and is subject to the provisions of Sections 305 for the National Aeronautics Space Act of 1958, public law 83-568 (72 Statute 435; 42 USC (2454).

RELATED APPLICATIONS

This application is a continuation-in-part of application Ser. No. 079,476, now U.S. Pat. No. 4,275,130, filed Sept. 27, 1979 by Walley E. Rippel and Dean B. Edwards, the same inventors herein, and owned by a common assignee.

BACKGROUND OF INVENTION

A conventional bipolar battery generally includes electrodes having a metallic substrate on which positive active material forms one surface and negative active material forms the opposite surface. The active materials are retained by various means on the substrate which is non-conductive to electrolyte ions. The electrodes are arranged in parallel stacked relation to provide a multi-cell battery with electrolyte and separator plates providing an interface between adjacent electrodes. Conventional monopolar electrodes, used at each end of the stack are electrically connected with the output terminals. While achieving respectable power densities, these conventional bipolar battery designs suffer substrate corrosion, seal and active material retention problems. For these reasons bipolar versions of the standard lead acid battery have failed to gain commercial success.

Most bipolar efforts to date have used metallic substrates. Specifically, bipolar lead acid systems have utilized lead and alloys of lead for this purpose. The use of lead alloys, such as antimony, gives strength to the substrate but causes increased corrosion and gassing. In addition to the problems of providing a liquid tight seal between the metallic substrate and adjacent non-conductive case (frame) materials, substrate corrosion, weight and strength factors have also been unacceptable. Furthermore, any attempt to reduce weight has led to increased problems of strength and corrosion. Accordingly a different approach must be used if acceptable weight and life are to be simultaneously achieved. Prior biplate constructions were characterized by the support of active material on the biplate substrate and various physical configurations for purposes of strengthening the biplate such as by providing a supporting grid or frame. Conventional metallic substrates presented seal and corrosion problems.

In the aforesaid copending application Ser. No. 079,476, a light weight bipolar battery construction is disclosed and claimed in which each biplate comprises a composite thermoplastic material with conductive fibers such as carbon graphite or metallic fibers serving as strengthening and conductive elements, each biplate having spaced lead stripes on opposite side surfaces in bonded electrical contact with the graphite fibers. Separator-plates of thermoplastic material are interleaved with the biplates of composite thermoplastic material, each separator-plate having bonded thereto porous resiliently yieldable mats serving to carry and support the active material, to provide transport for gases which form in the battery, and to store electrolyte liquid. Each biplate is bonded to a casing member which in turn is bonded to adjacent casing members. Interleaved biplates and separator-plates are held in a stack under compression by external pressure means and maintained in pressure assembly with active material in contact with the lead stripes. The disclosure of application Ser. No. 079,476 is incorporated herein by reference particularly the concept of providing biplates with lead stripes on opposite surfaces thereof and separator-plates carrying active material interleaved between adjacent biplates and held in pressure assembly by external means.

It should be noted that most prior bipolar battery constructions included biplates having a biplate substrate designed to conduct electrical current therethrough and to assist in the support of active material. The present invention relates to a quasi-bipolar battery construction in which the biplate substrate does not conduct electrical current therethrough. When the term "quasi-bipolar" is used it is meant that the biplate structure does not conduct electrical current through the material of the biplate substrate.

SUMMARY OF INVENTION

The present invention relates to a novel quasi-bipolar battery which includes improvements in the battery construction, the biplate construction, the separator-plate construction, the means and method for providing chambers between the biplates, and the means for maintaining the battery construction in operable pressure assembly and electrical contact.

The present invention contemplates a lightweight battery construction having characteristics of improved energy, power, and life, adaptability for assembly in a continuous process with resulting reduction of production costs, and improved conductivity/weight ratio. Such advantageous characteristics are in part provided by the concept of a frameless flexible biplate construction, the biplate construction of the present invention utilizing a continuous strip of thermoplastic material folded into pleated biplate walls and sealed along longitudinal edge portions thereof to provide sealed chambers adapted to receive separator-plates and to contain electrolyte liquid. The present invention contemplates that such a continuous strip of thermoplastic material serves not only to provide biplate structure but also battery casing structure. The present invention further contemplates a novel separator-plate generally similar to the separator-plate provided in said copending application and including scrim fabric means for holding active material, reinforcement, and adapted to be attached by bonding to a porous mat carried by a microporous separator substrate. The present invention contemplates that the scrim fabric means and porous mats contain electrolyte liquid and in some installations the top opening of each chamber may be covered and sealed by a top seal member for thermoplastic material bonded to the biplate structure.

Generally speaking the present invention provides a quasi-bipolar battery construction which avoids many disadvantages of prior bipolar battery constructions such as excess weight, sealing and corrosion problems, off gassing, limited energy and power densities and reduced cycling life. The present invention provides a useful battery construction for virtually all battery applications and particularly for electrical vehicles in which the ratio of energy and power to battery weight is critical for the range, speed and acceleration.

The primary object of the invention is to provide a novel improved quasi-bipolar battery construction and method of assembly and fabrication.

An object of the invention is to provide a biplate construction of light weight and which serves to provide a plurality of spaced biplates and battery casing walls.

Another object of the present invention is to provide a novel method of making such a biplate construction in which a continuous elongated strip of thermoplastic material provides integral biplate walls and battery casing walls.

Another object of the present invention is to provide a biplate construction and method of making the same in which a plurality of electrically isolated lead stripe arrays of selected pattern are provided on one face of the continuous biplate strip, the strip being then folded and sealed to locate the lead stripe arrays on opposite sides of a pleated or folded biplate wall structure.

Another object of the present invention is to provide a novel separator-plate of microporous thermoplastic material having on opposite faces thereof resilient porous mats and active material carried by scrim fabric means attachable to the mats.

A still further object of the present invention is to provide such an improved battery construction wherein the integral pleated flexible biplate strip is assembled with flexible separator-plates and maintained in operative assembly in electrical contact under compressive forces applied axially thereto by conductive external pressure plates and resilient yieldable means.

A further object of the present invention is to provide a biplate construction having on one face thereof a plurality of spaced electrically isolated lead stripe arrays, each array arranged about a transverse axis, the lead stripe array of one side having more lead than the lead stripes on the other side of said transverse axis.

A further object of the invention is to provide a biplate structure as mentioned hereinabove wherein the different arrangements of lead stripes on opposite sides of a transverse axis are interconnected by a lead stripe along said axis.

A further object of the present invention is to provide closure means for top openings of chambers provided by the folded biplate strip, the closure means being firmly sealed and bonded to adjacent portions of the biplate strip.

A still further object of the invention is to provide a novel battery construction of essentially frameless flexible compliant structure wherein flexible biplates, compliant separator-plates, and conductive end plates are held in an assembled compressed relation to provide effective electrical conductivity and long lasting support for active material on the separator-plates.

Another object of the invention is to provide a novel method of fabricating a biplate structure in which the application of lead stripe arrays to a biplate strip may be accomplished by several exemplary methods which facilitate production of the biplates.

Other general objects of the present invention include the provision of a light weight quasi-bipolar battery construction having improved power density, improved energy density, ease of manufacture as by a partially automated process, reduced costs of manufacture, a battery readily maintained, a battery providing use of non-metallic materials for reducing substrate corrosion problems, a battery providing more effective utilization of active materials because of improved surface to volume ratios made possible because of improved containment, reduced corrosion and reduced off gassing and improved conductivity to weight ratios.

Various other advantages and objects of the present invention are readily apparent from the following description of the drawings in which exemplary embodiments of the invention are shown.

IN THE DRAWINGS

FIG. 1 is a perspective view of a quasi-bipolar battery construction in the form of a single battery module embodying this invention.

FIG. 2 is a fragmentary enlarged sectional view taken in horizontal transverse plane indicated by line II—II of FIG. 1.

FIG. 3 is a fragmentary schematic plan view of the battery construction shown in FIG. 1.

FIGS. 4a, b and c are plan views of a continuous biplate strip showing steps of a method of providing the electrically isolated arrays of lead stripes; FIG. 4a being a fragmentary plan view of a thermoplastic strip, FIG. 4b showing the face of the strip of FIG. 4a provided with plated lead stripe arrays interconnected along one margin by a common electrically conductive lead stripe; FIG. 4c is a plan view similar to FIG. 4b with a portion of the longitudinal edge margin carrying the common lead stripe removed. FIG. 4d is an exploded view of a different method of applying lead stripes by decals carrying lead stripe arrays.

FIG. 5 is a fragmentary perspective view of the continuous biplate strip of FIG. 4c folded to provide spaced pleats defining chambers therebetween.

FIG. 6 is a schematic view showing the continuous biplate strip folded into pleats, longitudinal edge margins thereof between said plates being gathered and sealed to provide liquid-tight chambers, and the placement in two of such chambers of separator-plates, the figure being schematic and exaggerating the chambers between the pleats.

FIG. 7 is a fragmentary plan view of a different pattern of a lead stripe array to be provided on one face of a continuous biplate strip.

FIG. 7b is a fragmentary plan view of a different pattern of lead stripe array, each line representing a lead stripe, the stripes on one side of the transverse axis of said array being crossed to provide intersecting points and to provide more lead stripes than on the opposite side of the transverse axis of the array.

Figure 8:
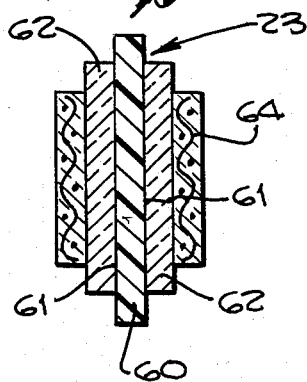

FIG. 8 is a transverse sectional view of a separator-plate showing active material carried by scrim fabric.

Figure 9:
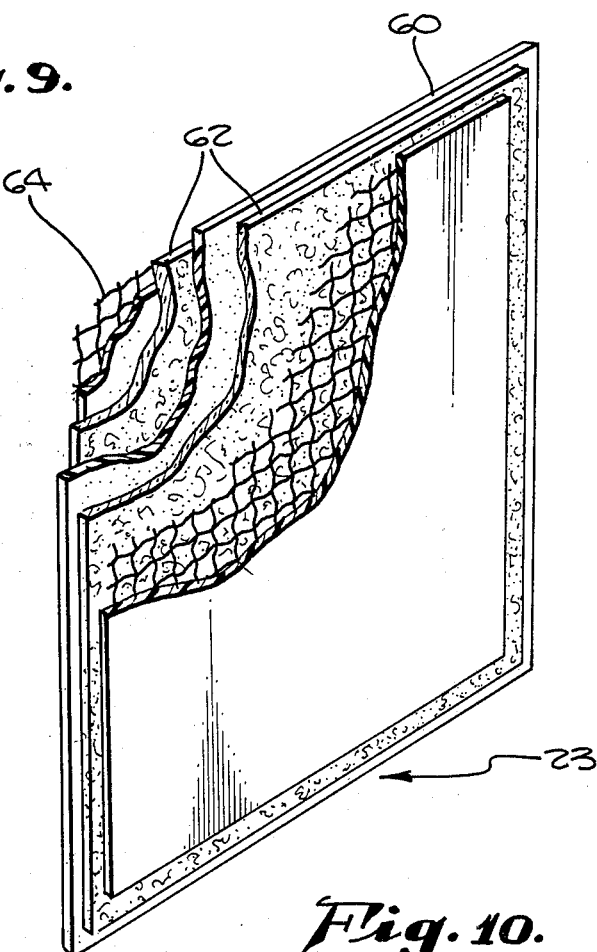

FIG. 9 is an enlarged perspective view of the separator-plate of FIG. 8, portions of each layer or lamina being broken away to better illustrate the construction.

Figure 10:
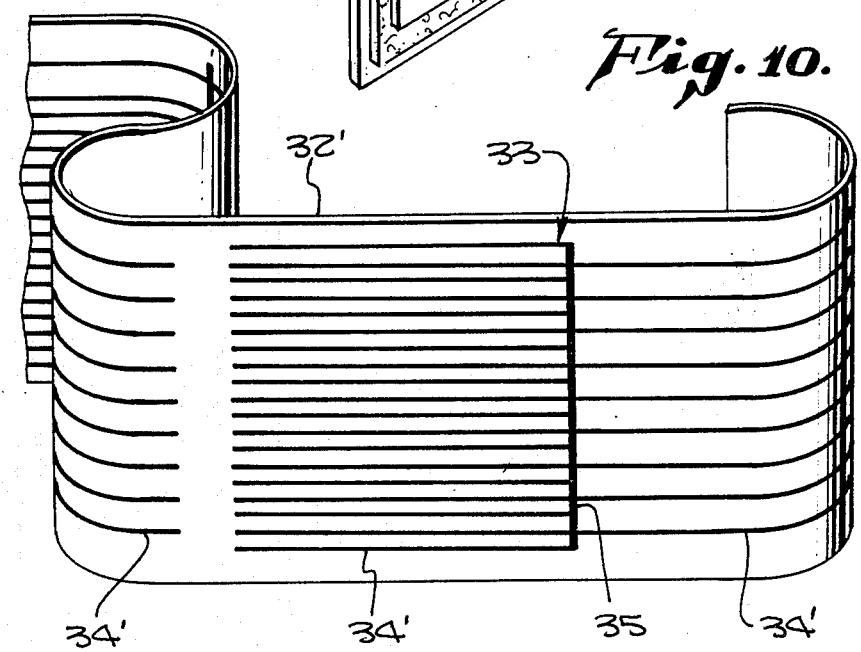

FIG. 10 is a fragmentary perspective view of a continuous flexible biplate strip provided with spaced arrays of different pattern than that shown heretofore.

FIG. 11 is a perspective view of a biplate embodying a different construction.

FIG. 12 is an enlarged fragmentary perspective view of an edge portion of the biplate shown in FIG. 11.

FIG. 13 is a fragmentary sectional view illustrating a battery construction having a battery casing similar to the battery in said copending application and embodying the biplate shown in FIG. 11.

FIG. 14a is a schematic view of a plurality of biplate battery modules such as shown in FIG. 1 arranged in tandem with terminal plates, the tandem assembly having end plates, and an electrical interconnection of said battery modules.

FIG. 14b is a schematic view of a modified construction of a plurality of battery modules in which a continuous biplate strip common to all modules is used to provide biplate structure.

FIG. 15 is a fragmentary perspective sectional view of a top portion of a battery construction including closure means for chambers between biplate walls.

DETAILED DESCRIPTION

A biplate battery construction embodying this invention is generally indicated at 20 (FIGS. 1 and 2). Battery construction 20 generally comprises a battery module 20 having a biplate structure generally indicated at 21 providing a plurality of spaced pleated or folded biplate walls 22 and providing a plurality of chambers 44 in which are positioned and held separator-plates 23. The chambers 44 in which the separator-plates 23 are received are formed by the pleated biplate walls 22 and wall portions 24 integral with the pleated biplate walls and serving as battery casing walls. Separator-plates 23 carry active material 25 on opposite faces thereof and are held in pressure contact with the pleated biplate walls 22 by conductive end plates 26 and resilient tension means 27 arranged to draw said end plates 26 toward each other and to hold the battery module under compression with the biplates and separator-plates in assembled pressure relation. Each end plate 26 is provided with a terminal connection 28. One or more battery modules 20 may be assembled in tandem or in stacked relation as shown in FIG. 14 to provide a battery of selected capacity and voltage and having end plates 26 provided at the assembly of one or more battery modules. FIG. 3 schematically illustrates a portion of the battery module of FIG. 1, the pleated, folded biplate walls 22 being provided with lead stripes 30 on opposite faces thereof, the lead stripes 30 being interconnected by a common transverse lead stripe 31 on the top edge of the biplate walls 22.

One of the improvements of this invention involves the construction of the biplate. As best seen in FIGS. 4a–c, 5, 6 and 10, a biplate embodying this invention is made in accordance with the following exemplary method. In FIG. 4a is shown a fragmentary portion of an elongated continuous strip 32 of a thermoplastic material such as a continuous phase resin material which is nonconductive to electrolyte ions. A suitable thermoplastic resin may be polyolefins such as polyethylene or polypropolylene. The strip 32 is of selected width and thickness, for example 8 inches wide and 0.010 inches thick. On one face 33 of strip 32 may be deposited in suitable manner a plurality of lead stripe arrays generally indicated at 33. Each array includes longitudinally extending parallel lead stripes 34 and a transverse stripe 35 provided at the transverse axis of the array.

The manner of application of the lead stripes on face 32a may be accomplished by various processes, one exemplary method including ionic deposition of an interface metallic layer on face 32a. The selected array pattern is provided in an appropriate mask and an atomic or ionic beam of lead or tin, for example, may be directed through the openings of the mask onto the polyethylene strip 32 to provide a thin metallized array pattern. Included in such metallized pattern is a longitudinally extending metallized deposited stripe of tin 36 along an edge portion of strip 32 and which serves as a common electrical lead to provide simultaneous electrical connection thru strips 35 to each of the several arrays being provided on the strip 32. After the metallized pattern has been completed on strip 32, lead may be electroplated on the tin interface. Lead fluoroborate is an example of a plating electrolyte which may be used.

After the lead stripes have been electroplated on the strip 32 in the arrays as shown, the longitudinal edge margin of strip 32 which carries the common electroplating stripe 36 is severed and removed from strip 32 to electrically isolate the plated arrays (FIG. 4c). For example, the width of biplate strip 32 as shown in FIG. 4c may be now reduced to 7 inches. The length of each array of lead stripes 33 may, for example, be 12 inches and the space between each array may be about 1 inch.

Other exemplary methods for providing lead strip arrays on the continuous polyethylene biplate strip include the provision of preformed, prepatterned lead strip arrays 33 made separately and then transferred onto the face of the continuous biplate strip by adhesively backing the arrays 33 and applying the adhesively backed arrays directly to the face of polyethylene continuous strip 32. Such lead strip arrays 33' may be in the form of separate, continuous, or interconnected decals which may be readily positioned and adhesively bonded to biplate strip 32.

Another method may include a roll-bond process in which lead tape of the desired width and thickness is adhesively coated and then applied by a machine to the face of a continuous strip 32. In such instance the transverse strip of lead may be omitted or applied at selected space intervals by a machine adapted to apply the tape transversely to the length of the strip.

Another exemplary method may include the use of photo-etching methods to provide a selected pattern of a lead stripe array. The method of application of the lead stripe array to the strip depends upon various factors such as adaptability to various lead alloys, uniformity of lead stripe arrays desired, costs, and the operating requirements for a particular battery application.

It will be understood that depending upon the requirements of a particular battery construction that the width and length of the lead striped arrays 33 may be varied and also the width and thickness of the strip of thermoplastic material 32. An exemplary width of each lead stripe may be 0.020 inches with lateral spacing of 0.10 inches and the lead thickness approximately 0.005 inches. It will be understood, of course, that various other methods may be used to apply lead stripe arrays on a continuous strip of suitable thermoplastic material.

In some instances, it may be desirable to provide a coating or sheet of corrosion resistant resin on face 32a of strip 32 to protect against anodic corrosion of the material of the thermoplastic strip. Such a corrosion resistant resin may be a fluorocarbon resin such as Teflon (polytetrofluoroethylene). Such a coating or sheet may be applied and bonded over the entire surface of strip 32 before applying the arrays thereon or may be applied only to those parts of strip 32 which will comprise the positive side of the biplate. However, for convenience of production and manufacture, it may be entirely suitable in some instances to provide a continuous coating or sheet of Teflon material on face 32a of the thermoplastic strip 32.

As shown in FIG. 10, such a continuous strip of thermoplastic biplate material generally indicated at 32' is flexible, pliant, and readily folded and shaped.

As noted in FIGS. 4c, 7a, 7b and 10, the lead stripe array pattern may be varied. In FIG. 10, for example, the lead stripe array 33' includes a transverse axis stripe 35'. On one side; that is, the positive side of the array, the number of lead stripes 34 are greater than the number of lead stripes 34 provided on the other side of the transverse stripe 35, the other side being the negative side of the array. In the example in FIG. 10, the stripes on the positive side are approximately twice as many as the stripes on the negative side. This proportion may vary. Likewise, the thickness of the lead stripes on one side may vary with respect to the thickness of the stripes on the opposite side; although for production purposes, it may be convenient to apply the lead on both sides of the array of the same general thickness.

In FIG. 7a, a fragmentary view of a modified lead strip array 133 is shown. In this array, each lead stripe 134 has a generally triangular configuration, the amount of lead tapering from the transverse stripe 135 to the end of the stripe. In this exemplary lead stripe array, the negative side is provided with fewer lead stripes 134 than the positive side by changing the spacing of strips 134 as shown in FIG. 7a.

A still further exemplary lead stripe array, which may be applied on a continuous biplate thermoplastic strip 32, is shown in FIG. 7b. Such an array 233 is provided with thin uniformly wide lead stripes 234, the lead stripes on the negative side of the array forming the boundaries of a triangular pattern. Lead stripes 234 on the positive side of the array are greater in number than on the negative side and are provided with points 236 of intersection. The stripes on both positive and negative sides of the array are connected by a transverse stripe 235. One of the advantages of intersecting points 236 of stripes 234 on the positive side is to reduce the effect of corrosion of a portion of said stripes since a greater number of electrical flow paths are provided and the effect of corrosion of a portion of a lead stripe is reduced.

The different lead stripe arrays have been described at this point in the application since each of the lead stripe arrays (except FIG. 4d) is provided with a transverse lead stripe at the transverse axis of the array. The transverse lead stripe provides added mechanical ruggedness and strength at the bend portions of the longitudinally arranged lead stripes and also provides conductivity between the longitudinal stripes which is essential if an electroplating method is selected as above described. As described with respect to the first mentioned array, the transverse stripes may be connected to a common longitudinal stripe, such as 36 (FIG. 4b) to be later removed after electroplating of the lead material.

After the lead stripe arrays have been applied to surface 32a of the strip 32, the flexible compliant strip is then folded or pleated to provide a configuration shown in FIG. 5. Such folding or pleating may be performed by using a pair of interdigitated racks of selected size and spacing so that when the return or hairpin-like folds are made in the strip 32 the transverse lead stripes 35 of each array will be located along the top edge of the folded or pleated biplate wall 22. Further, the height and spacing of such racks is such that the space 38 between adjacent arrays 33 will occur at the bottom of the pleated biplate walls and will provide a bottom wall 40 for each chamber 44 formed between biplate walls 22. As noted in FIG. 5, the ends of the lead stripes 34 terminate at the commencement of the bottom wall 40 of the chamber.

After the continuous strip 32 with the lead stripe arrays 33 deposited thereon has been folded as indicated in FIG. 5, longitudinal edge margins 41 of the folded strip may be gathered together to form wall portions 24 and for sealing as by thermal means at 42. It will thus be apparent that continuous strip 32 provides a continuous longitudinally extending central strip portion which serves to provide pleated biplate walls 22, bottom walls 40 of chambers 44, and longitudinal edge portions 41 provide side wall portions 24 for such chambers, thereby providing a continuous integral biplate structure and frameless wall structure for defining chambers 44 which receive separator-plates and contain electrolyte liquid.

The advantages of such a biplate structure for a lightweight battery are readily apparent since the biplate structure and wall structure of the battery is essentially frameless and the grid work and framing of individual separate biplates of the prior art is avoided. Thus, a considerable saving in weight of the casing walls and biplate structure is provided. Further, the method of fabricating the pleated biplate structure and walls for containing electrolyte liquid lends itself to automated production, manufacturing economies, and savings in assembly labor costs.

After the continuous strip 32 has been fabricated as described above and has been sealed into a lead striped biplate structure, separator-plates 23 may be inserted into each chamber 44, FIG. 6 schematically illustrating the introduction of separator-plates 23 into the chambers 44. Each gridless separator-plate 23 of this invention may be generally similar to the gridless separator-plates of said copending application Ser. No. 079,476 and includes improvements thereover as now described. It will be understood that the separator-plates described and claimed in said copending application Ser. No. 079,476 may be adapted for use in the biplate structure above-described, if desired.

Separator-plate 23 may comprise a separator-substrate 60 of suitable synthetic organic resin, preferably a thermoplastic material such a microporous polyethylene. Separator-plate 23 also corresponds in shape to the width and height of the chamber 44 formed by the pleated walls 22 of the biplate structure. Separator-substrate 60 may have bonded to opposite flat side surfaces 61 thereof porous fibrous mats 62 made of suitable nonconductive fibers such as glass fibers. Glass mat 62 may be of uniformly thick construction and have an exemplary thickness of about 0.015 inches. Each glass mat 62 may be suitably bonded to the face 61 of the separator substrate 60.

The separator-plate 23 of the present invention includes the use of loosely woven scrim fabric means 64 of chemical glass having a thickness of, for example, about 7 to 20 mils. The scrim fabric 64 serves to host or carry the active material which may be pasted in the scrim fabric with the scrim fabric serving as reinforcement of the pasted active material and separator-substrate during assembly and operation. In assembly, one of the scrim fabrices is pasted with standard "negative" active material and the other fabric is pasted with "positive" active material. Standard electrochemical formation of these materials may be carried out either prior to or after assembly into the battery structure. The pasted scrim fabrics may be attached by suitable means to glass mat 62 to provide integrity for the separator-plate assembly. The glass mats 62 prevent contact of the active materials with the separator-substrate 60.

It will be understood that scrim fabric means 64 may include two or more scrim fabrics arranged to provide enhanced active material retention and lateral strength. When two or more of the scrim fabrics are used on each side of the separator substrate 60 the size of the mesh of each fabric may differ and the orientation of the mesh of one fabric with respect to the other may be selectively varied to further improve retention of active material.

In the fabrication of the pasted scrim fabric with active material, the scrim fabric serves to reinforce the pasted active material and to facilitate handling and assembly of the active material with the glass mats, to reduce loss of active material during battery operation, and to prolong battery life. In the present invention, the active materials are pressed into the matrices or voids of the scrim fabric. The filled scrim fabric, after curing of the active material, permits handling of the pasted scrim fabric as a unit and convenient application to the glass mats which may have been bonded to the separator-substrate.

The active materials may be processed in accordance with conventional lead acid designs. After standard lead oxides including standard additives are pasted into the scrim fabric means, the pastes are then cured and electrochemically formed using conventional techniques. As with conventional batteries, electrochemical formation may be accomplished either prior to inclusion of the separator-plate into the battery structure or after the separator-plate is located in the chamber formed by the biplate structure.

The glass mats 62 are resiliently yieldable and porous for the passage of hydrogen and oxygen gases and also serve to contain a portion of the electrolyte liquid within its voids. As in the separator-plate of the copending application, the separator-substrate 60 has a peripheral border or margin which extends beyond the peripheral edges of the glass mats 62 and the edges of the glass mat 62 extend beyond the peripheral edges of the pasted scrim fabric 64. Exemplary thicknesses of the separator-plate laminate may include the microporous substrate 60 of nonribbed 10 mil thickness, each glass mat 62 may be of 15 mil thickness and pasted scrim material may be of 20 mil thickness.

In assembly of the battery construction illustrated in FIG. 1, it will be understood that the biplate structure formed from the continuous strip of thermoplastic material has been pleated to provide lead stripe arrays 33 on opposite sides of the pleated walls 22, to provide chambers 44 between pleated walls, the walls of the chamber including a portion 40 of the continuous strip separating the lead strip arrays and also including side wall portions 24 formed by heat sealing longitudinal edge portions drawn together after the pleating operation. Each separator-plate 23 formed as above described may then be inserted into each of the chambers 44 or pockets formed by the pleated walls 22.

The assembled biplate structure and separator-plates 23 are then compressed by drawing towards each other the conductive end plates 26, each plate 26 being placed at an end pleated wall, and interconnecting end plates 26 by a suitable resilient compliant cord 27 wound under tension between cord notches 70 provided adjacent ends of reinforcing transverse ribs 71 of each end plate 26. Conductive end plate 26 may also be reinforced by vertical parallel spaced ribs 72. It will thus be apparent that, as in the battery construction shown in the copending application, the separator-plates and biplate structure are placed under compression and held in pressure assembly by tension means. The several cell chambers formed by the biplate structure may then be filled with electrolyte, as for example, $H_2SO_4+H_2O$. The assembled battery construction 20 may then be placed in a protective container which may also be provided with positive and negative electrical terminals for suitably electrically connecting the battery to a load.

In the battery construction described above it will be understood that the battery is operable with the top of chambers 44 open, the electrolyte being contained in the voids of the glass mats 62 and other voids present in the arrangement of separator-plates 23 and biplate structure 22 while held in compressed assembled relation. In some battery installations such as where the battery may be inclined, subjected to vibration or shocks, as in a vehicle installation, or where free electrolyte is present in chambers 44 it may be desirable to close the top openings of each chamber 44. For this purpose closure means are provided for each chamber 44, such as a top closure or seal member 45 sealed or adhesively bonded to the upper portions of adjacent biplate walls 22 as indicated in FIG. 15. Each top seal member 45 may include a preformed member of a suitable thermoplastic or resin material having a selected cross section adapted to snugly fit in the top opening of chamber 44 when the battery construction is under its final compressed assembled relation, it being understood that the seal member 45 may be flexible and compliant and not resist the compressive forces. Each top seal member 45 may include suitable ports with caps therefor to permit the addition of water and electrolyte and to vent gases which form in chamber 44. Sealing of top members 45 to the biplate structure may be by thermal or adhesive sealant means.

It will be noted that a series of battery assemblies, modules, or constructions 20 without end plates 26 therebetween may be assembled in tandem to provide a multibattery construction of selected capacity, voltage and power. As shown in FIG. 14a, each battery construction or module 21 may comprise the structure illustrated in FIG. 1 with conductive end plates 26 removed, the end plates 26 being moved to ends of the assembly of a plurality of such modules and then compressed or drawn toward each other with the battery modules therebetween in the manner described above or in other suitable manner. In such a construction it will be noted that each module is provided a single terminal conductive plate 29 between adjacent modules, the positive side of each battery being adjacent the positive side of the adjacent module and the negative side of each module being adjacent the negative side of an adjacent module. The conductive terminal plates 29 may be readily interconnected in parallel by suitable electrical interconnection as shown. Such a multiple battery module assembly may also be placed within an outer protective container.

Another construction of exemplary parallel connected battery modules 20 may include a continuous biplate structure as schematically indicated in FIG. 14b. In such multiple battery construction a continuous biplate strip 32" may be provided with selected lead stripe arrays and may be of a selected length to provide biplate structure for all of the battery modules. After pleating to provide biplate walls 22" at selected spaced intervals, separator-plates 23" may be inserted in a selected number or group of adjacent chambers and may be omitted in a next chamber 44" and in place thereof a conductive terminal plate 29" may be inserted as shown in FIG. 14b. Conductive end plates 26" provided with terminal posts 28" may be positioned at ends of the pleated biplate structure and separator-plate assembly, the end plates being drawn together by a tension means such as the elastic cord 27 in order to place the entire assembly under compression as described above. It will be understood that in such a multiple battery module construction the number of battery modules may be varied depending upon the capacity and voltage required. The use of a continuous biplate structure common to all of the battery modules facilitates assembly and further reduces costs.

In FIGS. 11, 12 and 13 is shown a modified biplate structure for a battery particularly of the construction and arrangement shown in copending application Ser. No. 079,476. FIG. 13 is a fragmentary sectional view of such a battery construction slightly modified in order to accommodate the biplate structure shown in FIGS. 11 and 12. In general, the bipolar battery construction of said copending application includes a plurality of casing members 80 supporting and positioning a biplate, the casing members 80 being thermally bonded together at 81. Between biplates were interposed separator-plates 82 adapted to carry active material on their opposite faces. The assembly of biplates, separator plates and casing members were held and maintained under compression by external means. In the copending application, the biplate structure included a substrate of thermoplastic resin in which were embedded graphite fibers to provide electrical conductivity through the substrate to electrically interconnect lead stripes provided on opposite faces of the substrate.

In the present invention of a biplate structure of FIGS. 11-13, inclusive, a biplate generally indicated at 84 may comprise a substrate 85 of suitable thermoplastic resins for example polyolefins such as polyethylene or polypropylene. Substrate 85 may be of rectangular shape of suitable width, height and thickness. Continuously wound about top and bottom edges of substrate 85 are a plurality of spaced parallel lead filaments 86. Each filament 86 may be provided with an adhesive surface or tape to adhesively attach the lead filament to the surfaces of substrate 85. In the example shown in FIGS. 11-13, each lead filament 86 comprises a flat lead stripe. The lead filament may comprise a lead conductor of circular cross section provided with a fiberglass center or core for reinforcing the lead filament. Such a lead conductor of circular cross section may also be suitable adhesively bonded to surfaces of substrate 85.

Substrate 85 may be received and held within a frame 88 of themoplastic material comprising side and bottom portions 89 and 90 providing a continuous inwardly facing recess 91 adapted to receive side edge portions 92 and bottom edge portion 93 of substrate 85 to support the substrate. The bottom portions 94 of lead filaments 86 are received within the recess 91 in the bottom portion 90 of the frame 88, are covered by bottom portion 90 and are sealed in the bottom portion 90 as by thermally bonding the frame to the edges of the substrate. Ion currents in the electrolyte which is contained within the chambers between the biplates is thus prevented from travelling from one side of the biplate to the other.

A Teflon sheet 96 may be provided on the positive side of the biplate substrate 85.

The biplate construction 84 serves to reduce corrosion, provides a reduction in weight, provides low electrical resistance, and minimizes cost. It will be understood that such a biplate structure 84 may be adapted for use in bipolar battery constructions such as shown in said copending application and in other battery constructions in which the separator-plate carries the active material.

It will be understood that the construction of a battery, as described above, readily lends itself to an effective, efficient, continuous part-automated process for producing a lightweight quasi-bipolar battery having improved energy, power, and life characteristics. Sequential steps of cutting a thermoplastic strip of selected width to a selected length, applying lead stripe arrays to one face thereof, folding the continuous strip in a manner to provide folded or pleated biplate walls having electrically connected lead stripes thereon, sealing the longitudinal edge margins of the continuous strip while providing chamber walls and a bottom wall for containing electrolyte liquid, provide an integral continuous thermoplastic structure which is readily formed and which provides frameless and gridless biplate structure, as well as serving the function of a casing or housing means for biplates, separator-plates and electrolyte liquid. Separator-plates are provided in which the active material may be readily handled and attached to the separator-substrate and glass mats bonded thereto. The assembly of integral biplates and chamber walls with separator-plates in said chambers when compressed and maintained in pressure assembly serves to provide a battery unit which lends itself to convenient assembly with other like units to provide multicell battery modules and battery constructions of selected capacity and voltage and adapted to be connected electrically in parallel or in series. The elimination of frames and grids in connection with the biplate and separator structure provides a considerable reduction in weight and a considerable increase in conductivity to weight ratio.

It will be readily noted that the maintenance of the battery construction under assembled pressure relation by means of external tension cords not only serves to conserve and extend the life of the active material, but also permits the battery construction to expand and contract as a result of density changes in the active materials. It will be understood that the techniques for providing lead stripe arrays on the continuous polyethylene strip may vary.

It will also be apparent to those skilled in the art that certain features and concepts of the invention as described above relating to quasi-bipolar battery constructions may also be utilized in bipolar and perhaps other battery constructions and such utilization in battery constructions other than quasi-bipolar is within the spirit of the inventions described above.

It will be understood that various modifications and changes may be made in the battery construction, method of making a biplate structure, and separator-plate structure described above which come within the spirit of this invention and all such changes and modifications coming within the scope of the appended claims are embraced thereby.

We claim:

1. A battery construction comprising:
   integral frameless biplate means including spaced biplate walls having top edge faces and oppositely directed side faces, side walls, and bottom walls defining a chamber therebetween,
   lead stripes on both side faces, each stripe on one side face being connected at the top edge face with stripes on the other side face;

a separator-plate carrying active material on opposite faces thereof received within each chamber;

and means to compress and to retain said biplate means and separator-plates in assembled pressure relation.

2. In a construction as stated in claim 1 including scrim fabric means on each separator-plate holding said active material.

3. A construction as stated in claim 1 wherein said integral biplate means include a continuous pleated strip of thermoplastic material, said lead stripes on both faces of each pleated biplate wall being electrically isolated from the lead stripes on opposed biplate walls of a chamber.

4. A construction as stated in claim 1 wherein said spaced biplate walls are pleated portions of a continuous strip of thermoplastic material.

5. In a construction as stated in claim 1 including:
conductive end plates for said assembly;
said means to compress and retain said biplate means and separator-plates in assembled pressure relation including resilient means interconnecting said end plates.

6. A biplate construction comprising
a continuous strip of thermoplastic material formed into spaced pleats;
lead stripe arrays on opposite faces of said pleats and electrically isolated from arrays on adjacent pleats;
longitudinal edge portions of said continuous strip being sealed between said pleats to provide walls of chambers adapted to receive separator-plates and to contain electrolyte liquid.

7. A construction as stated in claim 6 wherein an array on one face of a pleat has fewer lead stripes than the other face of said pleat.

8. A construction as stated in claim 6 wherein the array on one face of a pleat having lead stripes intersecting other lead stripes on said one face.

9. A construction as stated in claim 6 wherein said lead stripe arrays on opposite faces of each pleat have different amounts of lead,
and a lead stripe along the edge face of said pleat interconnecting said lead stripe arrays of different amounts of lead.

10. A construction as stated in claim 6 including a continuous covering of an electrochemically stable resin on the face of said continuous strip provided with said lead stripes.

11. A separator-plate for a battery construction comprising:
a microporous sheet of synthetic organic resin;
a porous layer on each face of said separator-plate;
a scrim fabric adjacent to and bonded to said porous layer;
and active material carried by said scrim fabric.

12. In a quasi-bipolar battery construction, the combination of:
a frameless biplate means comprising
a continuous folded flexible strip of non-conductive thermoplastic material having spaced electrically isolated arrays of lead stripes on one face of said folded strip;
longitudinal edge portions of said strip along said folds being sealed to define chambers adapted to receive separator-plates carrying active material and to contain electrolyte liquid.

13. A battery means comprising:
a plurality of battery modules,
each battery module comprising
a continuous biplate strip having folded pleats and having electrically isolated spaced lead stripe arrays on faces of said pleats,
edge portions of said pleats being sealed to form chambers;
separator-plates carrying active material in each chamber;
terminal plates at ends of each module for connecting terminal plates thereof in parallel;
and means for holding said modules in assembly and under compression.

14. A battery means as stated in claim 13 wherein said means for holding said battery modules under compression and in assembly include
conductive end pressure plates at ends of end modules;
and resilient means extending between and interconnecting said end pressure plates for holding said modules in assembled pressure relationship.

15. A battery means as stated in claim 12 wherein said battery modules are arranged in tandem.

16. A multiple module battery construction including a common biplate structure comprising a continuous integral biplate strip providing spaced pleated biplate walls having electrically isolated lead stripe arrays thereon and providing chambers to contain electrolyte liquid;
separator-plates supporting active material received within a selected group of adjacent chambers;
a terminal plate received within a chamber located between said adjacent groups of chambers;
conductive end and pressure plates at ends of said biplate structure;
and means holding said biplate structure, separator-plates, terminal plates, and end plates in assembly and under compression.

17. A biplate construction for a battery comprising
a biplate of thermoplastic material having top, bottom, and side edge portions and oppositely directed flat surfaces;
a lead stripe filament extending continuously along said flat surfaces and over and under said top and bottom edge portions;
and a frame of thermoplastic material receiving at least said bottom and side edge portions of said biplate, thermally bonded thereto, and covering in sealed relation a portion of said lead stripe at said bottom edge portion of the biplate.

18. A biplate construction as stated in claim 16 wherein
said lead stripe filament is flat.

19. A biplate construction as stated in claim 16 including
adhesive means on one side of said lead stripe filament for attaching said filament to said biplate.

20. A biplate construction as stated in claim 16 wherein
said lead stripe filament is of circular cross section.

21. A biplate construction as stated in claim 20 wherein said lead stripe filament includes a fiberglass core.

22. In a battery construction including a plurality of separator-plates carrying active material on opposite faces thereof, casing means of thermoplastic material, and external means for maintaining said battery construction under compression, the provision of:

a plurality of biplates, each biplate being of thermoplastic material, a plurality of spaced lead stripe filaments, each filament being wound continuously around said biplate and attached thereto, and a frame of thermoplastic material receiving edge portions of said biplate, thermally bonded thereto, and covering said lead stripe filament at one of the biplate edge portions;

said frames of said biplates being secured to said casing means.

* * * * *